United States Patent
Leu

(10) Patent No.: US 6,820,817 B2
(45) Date of Patent: Nov. 23, 2004

(54) ADJUSTABLE ELECTRONIC THERMOSTAT VALVE

(75) Inventor: Peter Werner Leu, Kyunggi-do (KR)

(73) Assignees: Hyundai Motor Company, Seoul (KR); Inzi Controls Co., Ltd., Kyunggi-Do (KR)

( * ) Notice: Subject to any disclaimer, the term of this patent is extended or adjusted under 35 U.S.C. 154(b) by 0 days.

(21) Appl. No.: 10/334,926

(22) Filed: Dec. 31, 2002

(65) Prior Publication Data

US 2003/0150923 A1 Aug. 14, 2003

(30) Foreign Application Priority Data

Feb. 9, 2002 (KR) .................................. 10-2002-0007690

(51) Int. Cl.[7] .................................................. F01P 7/14
(52) U.S. Cl. ...................................... 236/34.5; 236/100
(58) Field of Search .......................... 236/34, 34.5, 100

(56) References Cited

U.S. PATENT DOCUMENTS

| | | | | |
|---|---|---|---|---|
| 3,121,331 A | * | 2/1964 | Von Platen | .................. 60/527 |
| 3,313,483 A | * | 4/1967 | Nallinger | ................... 236/34.5 |
| 3,907,199 A | * | 9/1975 | Kreger | ................. 237/12.3 B |
| 4,550,693 A | * | 11/1985 | Saur | .......................... 123/41.1 |
| 4,674,679 A | * | 6/1987 | Saur | .......................... 236/34.5 |
| 4,961,530 A | * | 10/1990 | Wagner | ..................... 236/34.5 |
| 5,385,296 A | * | 1/1995 | Kurz et al. | ................ 236/34.5 |

* cited by examiner

Primary Examiner—William E. Tapolcai
(74) Attorney, Agent, or Firm—Morgan Lewis & Bockius LLP

(57) ABSTRACT

The present invention relates to an adjustable electronic thermostat valve comprising an actuating means provided with a rod for stroking a chamber of an expendable thermal element, so that temperature at which the thermostat valve opens can be easily adjustable based on driving condition of an automobile by changing the volume of the chamber of the expendable thermal element, whereby a cooling efficiency of the engine is maintained in optimized range. As a result, emission of exhaust gas and consumption of fuel is significantly reduced.

12 Claims, 5 Drawing Sheets

ADJUSTABLE ELECTRONIC THERMOSTAT VALVE

FIELD OF THE INVENTION

The present invention relates to a thermostat valve used in a cooling system of an automobile, more particularly, to an adjustable electronic thermostat valve.

BACKGROUND OF THE INVENTION

In general, a thermostat valve is installed between the automobile engine and radiator and functions to maintain the temperature of coolant in a preferred range by controlling the flow of coolant to the engine in accordance with change of the temperature of the coolant. The thermostat valve can eventually control the temperature of the engine by control of the amount of flow of the coolant.

A conventional thermostat valve that is widely used is a mechanical operating type that opens or closes the valve in accordance with up and down movement of a piston through which the expansion and contraction of a thermal expandable element is transferred. For example a thermostat of the mechanical operating type may include a wax activator. When the temperature of the coolant rises above a threshold value (approximately 80~90° C.), the wax in a solid state is changed into liquid. Subsequently, the actuating force generated by the expansion of the volume of the wax is transferred to a valve mechanism.

However, the above-described conventional thermostat valve is disadvantageous in that there is a limit to the ability to control the temperature of the coolant considering, for example, driving conditions because the opening and closing operation of the valve only depends on the preset temperature of the coolant. While a cooling system of an automobile is generally designed to satisfy the toughest driving condition such as full load, high ambient temperature, and etc., actual driving is, however, typically conducted with about 70% of full load. Accordingly, over-cooling of the engine can occur, which results in increasing consumption of fuel and exhaust containing excessive pollutants.

For the foregoing reason, there is a need for a thermostat valve that can optimize a temperature of coolant to engine by raising the temperature of a coolant while the engine is operating with partial load and lowering the temperature of a coolant while the engine is operating with full road. In order to overcome drawbacks of the prior art, attempts to provide an adjustable electronic thermostat valve that optimizes a temperature of coolant to engine have been made. Ideally, such an adjustable electronic thermostat valve would maintain an engine under the optimized cooling condition by controlling the temperature of coolant to the engine based on driving conditions and load conditions, whereby decrease of exhaust gas and fuel consumption can be expected.

In prior attempts to address this problem, thermostat valves have been provided with heating means to cooperate with the expandable wax element. Such an electronic thermostat valve comprises basically same elements as a conventional mechanical thermostat valve with the addition of the heating means. Power supplied to the heater is controlled based on driving conditions such as speed of an automobile, temperature of intake air, and loading conditions.

However, the above-described electronic thermostat valve is disadvantageous in that the parts of the valve are relatively easily damaged by high temperature caused by heating means, and further, the response time is slow. The specific drawbacks of prior electronic thermostat valves include, for example, heating defects created in the wax or other elements of the valve, and delay in operating the valve in response to the supply electric power to the heater because of the time delay to heat up the heater and expand the wax. Also, in the process of sealing the thermostat valve case, electric wires for supplying electric power to the heater can be damaged. Even if the sealing process is completed without any defect in the electric wires, the sealing material such as epoxy is easily degraded or destroyed due to the vibration of a engine. In the event that the thermostat valve is operated in safe-mode due to the failure of electronic parts, the engine continues to overheat potentially resulting in critical damage to the engine.

SUMMARY OF THE INVENTION

Embodiments of the present invention provide an adjustable electronic thermostat valve comprising an actuating means provided with a rod for stroking a chamber of an expendable thermal element. With this arrangement, the temperature at which the thermostat valve opens and closes, can be easily adjusted based on driving conditions by changing the volume of the chamber of the expendable thermal element, whereby a cooling efficiency of the engine is maintained in optimized range. As a result, emission of exhaust gas and consumption of fuel is significantly reduced.

Further, preferred embodiments of the present invention include actuating means capable of directly changing the volume of the chamber of the expendable thermal element, so that the operation of the valve in response to a control signal is promptly accomplished. This can provide a rapid response characteristic, whereby temperature of coolant to an engine can be accurately controlled.

Also, a fail-safe device is preferably included so that the thermostat valve properly functions with only the expandable thermal element operating when the actuating means of the valve is unable to operate due to the failure of supplying electric power.

Preferably an adjustable electronic thermostat valve according to the invention comprised an actuating means employing a screw-feeding method to obtain sufficient displacement of the valve even though the stroke of the actuating means is relatively small.

Also, preferred embodiments unintended movement of the valve such as a fluctuation or vibration by fixing the expandable thermal element of the valve, whereby the valve is more accurately opened or closed.

An adjustable electronic thermostat valve according to further preferred embodiments of the present invention comprises an actuating means that operates in response to control signals concerning driving conditions, with the actuating means having a screw-feeding rod. A chamber accommodating an expandable thermal element begins to expand at preset temperature wherein the volume of the chamber is changed by the screw-feeding rod. A piston is operatively connected to the chamber and opens or closes a valve plate in accordance with the change of volume of the chamber. A power-delivering liquid and diaphragm transfers expansion force of the expandable element to the piston.

BRIEF DESCRIPTION OF THE DRAWINGS

The aforementioned aspects and other features of the present invention will be explained in the following description, taken in conjunction with the accompanying drawings, wherein.

DETAILED DESCRIPTION OF PREFERRED EMBODIMENTS

Figure 1:
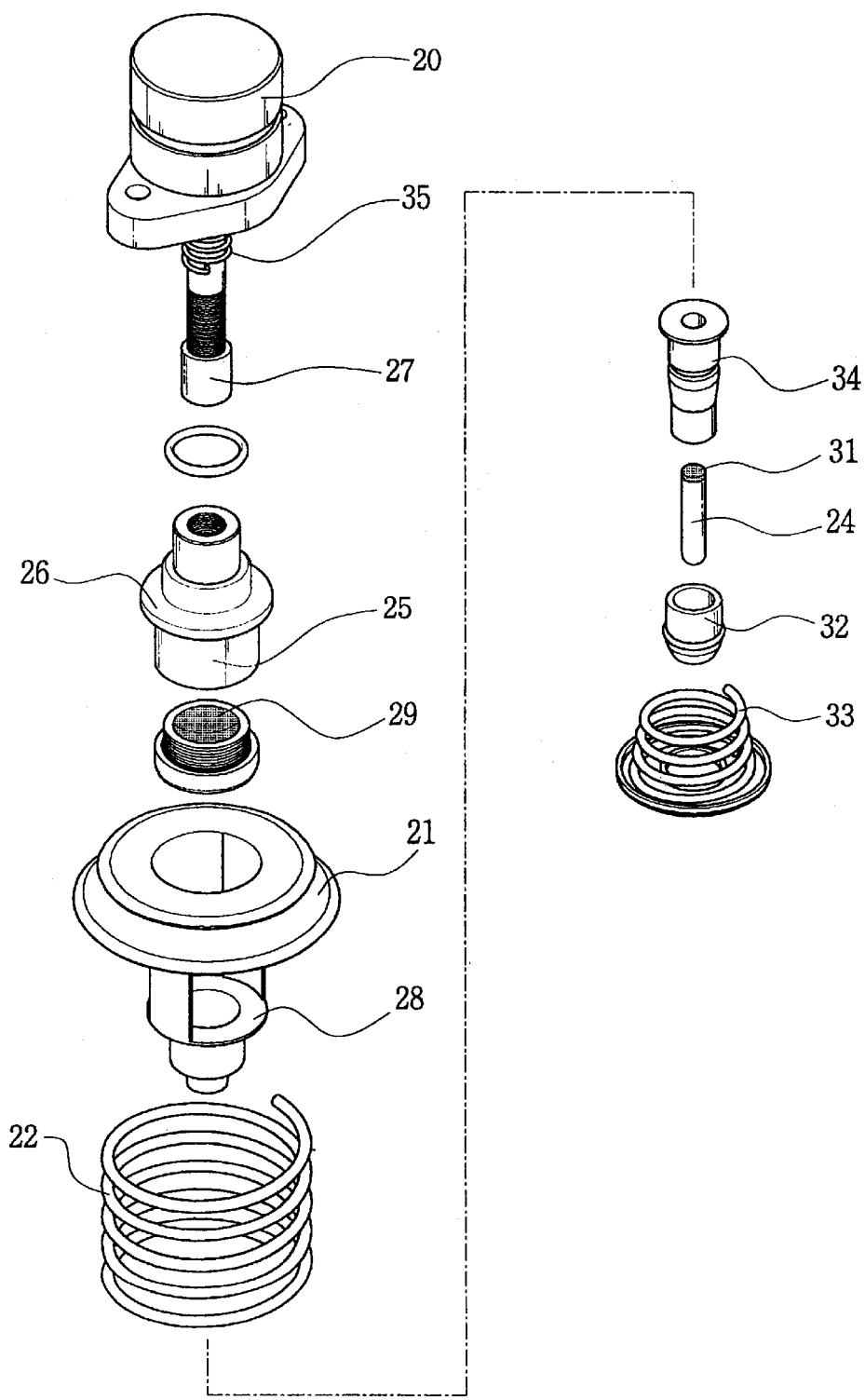
FIG. 1 is an exploded view of an adjustable electronic thermostat valve according to an embodiment of the present invention.
Figure 2:
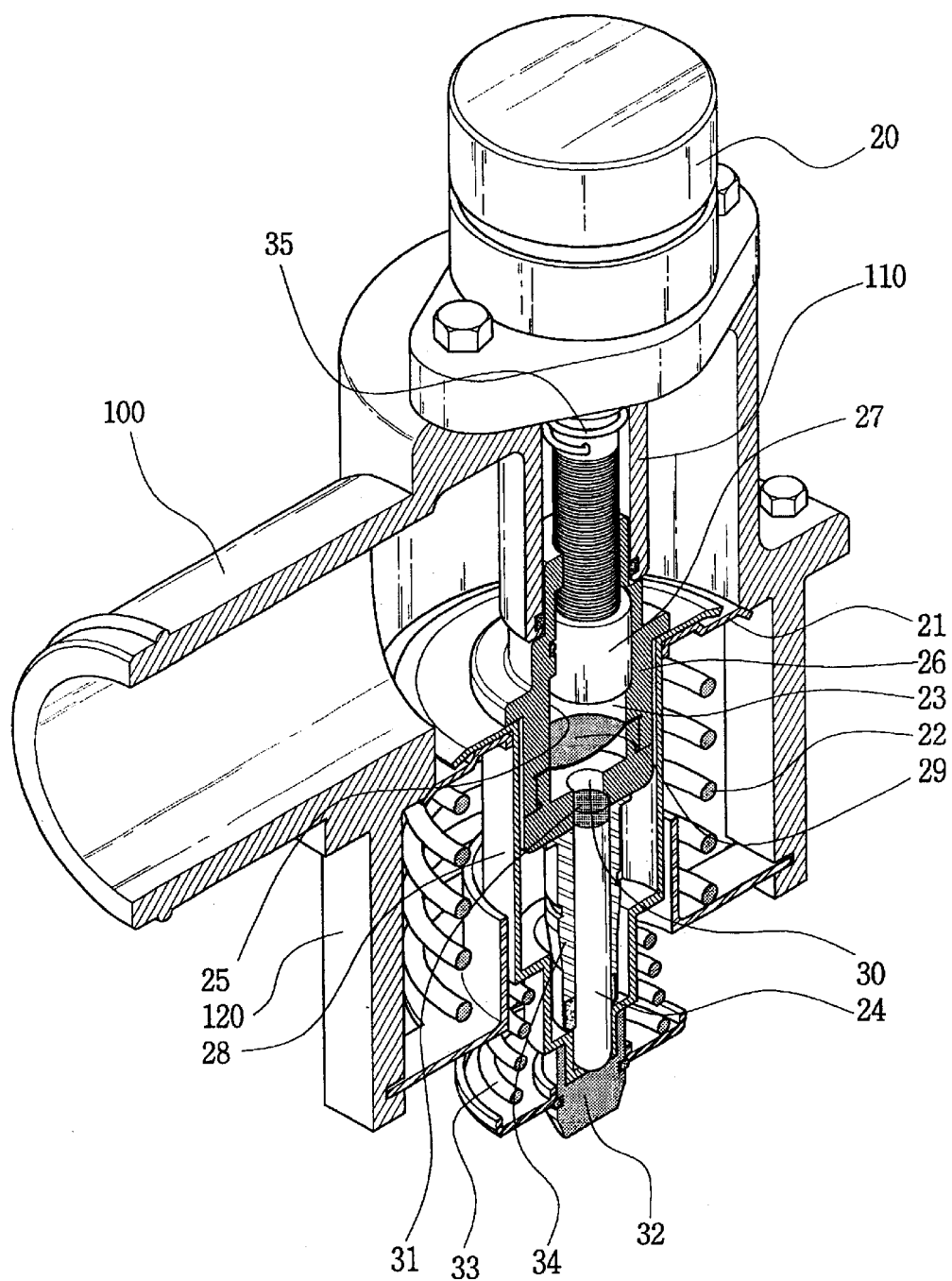
FIG. 2 is a perspective, sectional view of an adjustable electronic thermostat valve according to an embodiment of the present invention.

Hereinafter, a preferred embodiment of the present invention is described in detail with reference to the accompanying drawings. As shown in FIGS. 1 and 2, an adjustable electronic thermostat valve according to one embodiment of the invention is provided with an actuating means 20 controlled by an electronic control unit (ECU) of an automobile (not shown) and a case 26 having a chamber 25 accommodating an expandable thermal element 23. A rod 27 of the actuating means 20 is partially inserted into the chamber 25 and is engaged to an upper part of the case 26 with screw thread. Accordingly, rotating movement generated by the actuating means 20 is transformed to linear movement of the rod 20 by means of screw thread formed at the part of the rod 27 and the case 26. The actuating means 20 for generating a movement in response to input of electric power may be selected by a person skilled in the art. Suitable devices include, for example, a linear step motor, a DC motor or a linear solenoid, which have a rapid response. In the event that the liner solenoid is adopted as an actuating means, then the screw engagement mentioned in the above embodiment is not required because the linear movement generated from the linear solenoid can be directly applied to the rod 27. Namely, a slide connection can be used instead of screw connection.

The actuating means 20 and the case 26 are installed onto a housing 100 and a supporting element 110 downwardly extending, respectively. The actuating means 20 is mounted on the top of the housing 100 having the rod 27 passed through supporting element 110, the rod being partially inserted into the case 26. And an upper part of the case 26 is inserted into the supporting element 110 and secured thereto.

Further, the thermostat valve according to a preferred embodiment of the present invention is provided with a piston 24 and a moveable case 28 for moving a valve plate 21. The piston 24 guided by a piston case 34 moves up and down in accordance with the expansion and contraction of the expandable thermal element. The movable case 28 contacting the piston 24 and the valve plate 21 at the both ends thereof, controls the valve plate 21 in response to the movement of the piston 24.

A diaphragm 29 and a power-delivering liquid 30 of gel type are preferably provided in order to transform the expansion of the thermal element into a linear motion that is acceptable to the piston 24. The diaphragm 29 encloses the chamber 25 of the expandable thermal element and transfers the expansion of volume in the chamber to the power-delivering liquid 30. Subsequently, the power-delivering liquid 30 filled in the space between the piston 24 and the diaphragm 29, moves the piston 24 in accordance with the movement of the diaphragm 29. For sealing the power-delivering liquid 30 in airtight manner, it is preferable to dispose packing 31 made of rubber material at the end of the piston.

A stopper 32 and a supplementary spring 33 are disposed at the lower end of the movable case 28 for opening or closing a bypass passage. A valve plate 21 is disposed beneath the flange of the movable case 28 and elastically supported by the spring 22 mounted on a supporting bridge 120.

Hereinafter, the operation of an embodiment according to the present invention is disclosed.

Under the isothermal circumstance, even if the volume of the expandable thermal element is constant, volume of the chamber of the expandable thermal element can be changed by the stroke of the rod. Namely, the volume of the chamber can be controlled by changing the depth of the rod, which is inserted into the chamber. In order to clarify the relationship between the stroke of the rod and the displacement of the valve plate, an example is disclosed below.

For example, if

Stroke of the rod: $\Delta L=2$ mm;

Outer diameter of the rod: $D=8$ mm;

Outer diameter of the piston: $D'=4$ mm;

Then, the change of the chamber: $\Delta V = \Delta L \cdot \pi \cdot D^2 / 4 = 100.48$ mm$^2$.

Therefore, stroke of the piston: $\Delta L' = \Delta V/(\pi \cdot D'^2/4) = 8$ mm.

As noticed from the above example, with small stroke of the rod, it is able to obtain enough displacement of the piston. In addition, the displacement of the piston can be properly changed by changing the ratio of the diameter of the rod to the diameter of the piston. Consequently, enough amount of coolant to maintain the engine in optimal range of temperature is supplied to the engine even though the stroke of the rod is quite small.

Further, the thermostat valve of the present invention can precisely control the temperature of an engine because the many factors concerning the driving condition are taken into consideration in operation of the valve. The cooling system of an automobile can be optimized by employing an actuating means, such as a step motor, which readily control the amount of the displacement of the valve plate. Accordingly, the coolant supplied to the engine can be precisely controlled and thus, it is possible to overcome the drawbacks in a conventional thermostat of mechanical type, such as delayed responding time and fixed cooling ability regardless of the change of driving conditions. For example, under the certain circumstances of driving conditions requiring significant coolant such as full load condition or high speed driving, the thermostat valve of the present invention promptly, precisely controls the displacement of the valve plate in response to the condition by means of the rod stroke of the step motor.

Figure 3:
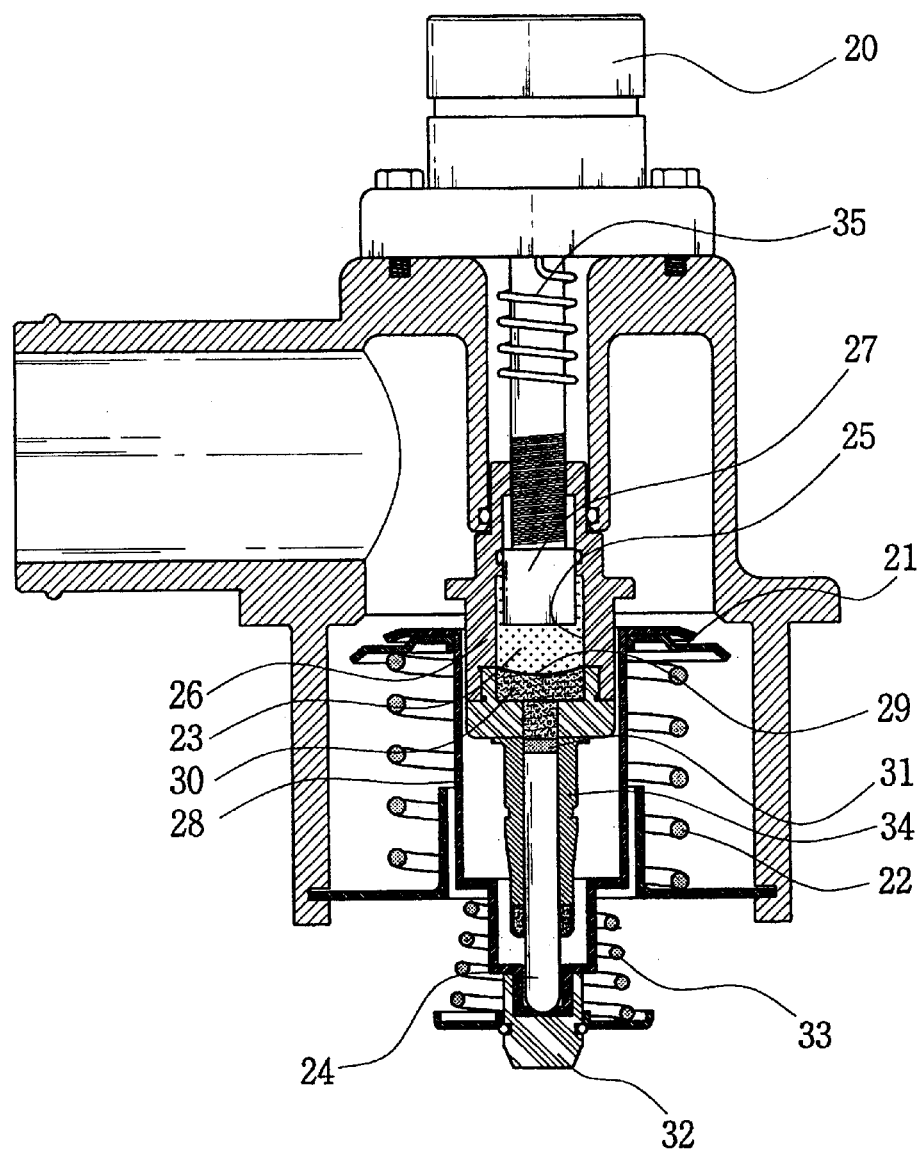
FIG. 3 is a sectional view showing open state of an adjustable electronic thermostat valve according to an embodiment of the present invention.
Figure 4:
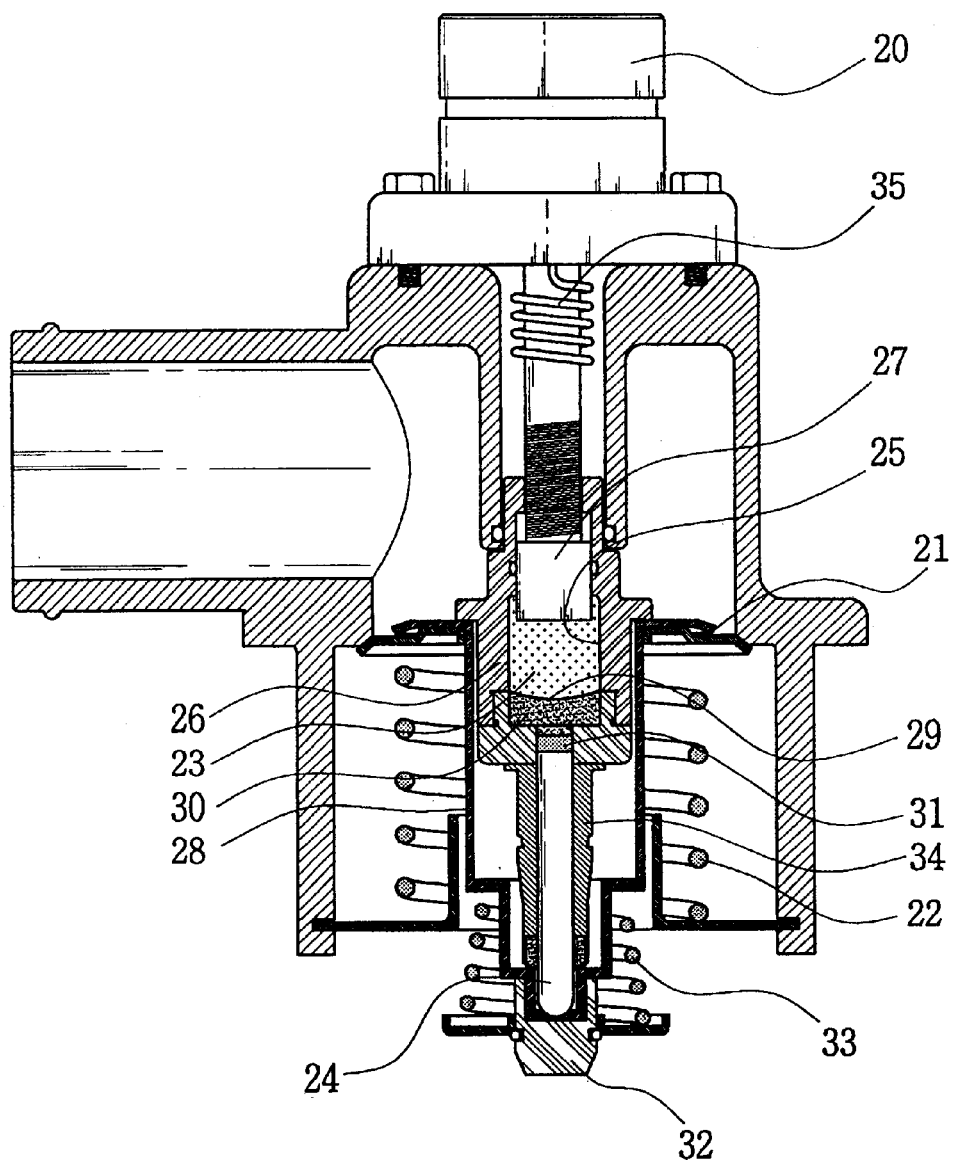
FIG. 4 is a sectional view showing close state of an adjustable electronic thermostat valve according to an embodiment of the present invention.
Figure 5:
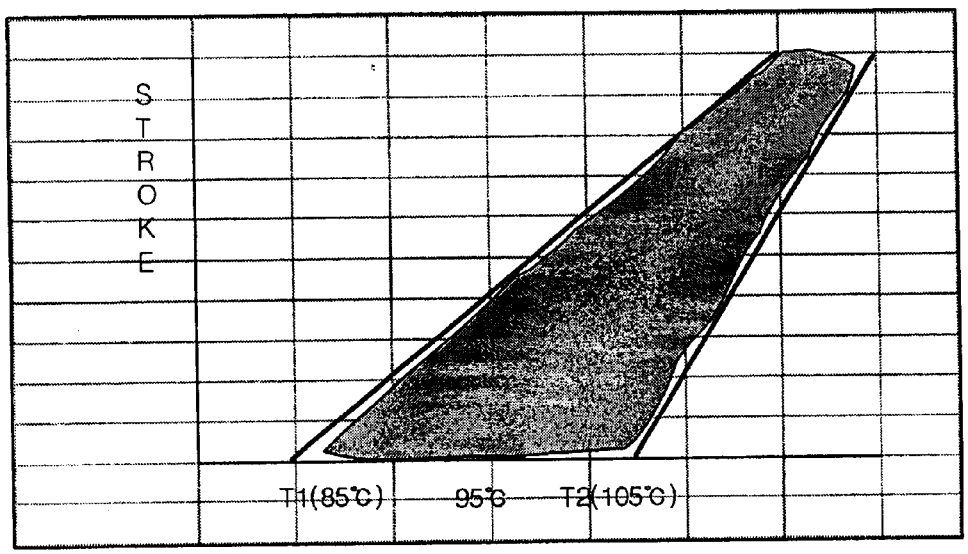
FIG. 5 is a graph showing the variation of an opening and closing temperature of an adjustable electronic thermostat valve of the present invention in accordance with change of the stroke of a rod.

As shown in FIGS. 3, 4 and 5, by controlling the stroke of the rod by means of the ECU that generates control signals based on load state of the engine, engine RPM (revolution per minute), coolant temperature, and temperature of intake air the present invention can change the volume of the chamber of the thermal element, so that a range of temperatures at which the valve operates can be changed in accordance with the driving conditions. The range of temperature is generally between about 85° C. and 105° C. For example, in the event that prompt supply of coolant to an engine is required due to the increase of load, as shown in FIG. 3 and FIG. 5, the rod is deeply inserted into the chamber of the thermal element, so that the temperature at which the valve plate opens lowers, for example, about to about 85° C. In the opposite case (partial load), as shown in FIG. 4 and FIG. 5, the rod is pulled out from the chamber of the thermal element, so that the temperature at which the valve plate opens is increased to about 105° C. Referring to FIG. 5, opening or closing operation of the valve plate is selectively conducted at the region depicted in the figure as a gray solid in accordance with the movement of the rod. The thermostat valve according to the present invention is able to maintain a cooling system of an automobile in optimized state by controlling the flow of the coolant to an engine in response to the driving conditions in real-time base.

Further, the embodiment of the present invention employs a unique mechanism for accurate operation. An expandable thermal element having flexibility in its structure is designed not to directly involve in the operation of a valve plate. Instead, the operation of the valve plate is done by movement of a moveable case and a piston, which move relative to the fixed thermal element. In other words, a case accommodating the thermal element is physically fixed to a valve housing, and only provides expanding force with other elements. An actual movement of the valve plate is accomplished by the piston and the moveable case where the expanding force is transferred. Accordingly, the thermostat valve according to the present invention can precisely control the valve plate without the any mechanical malfunction because of exclusion of the thermal elements having flexibility.

Further, the embodiment of the present invention is provided with fail-safe device in case of disconnecting electric power. When electric power supplied to an actuating means is unexpectedly disconnected with some reason, a critical damage to engine would be caused if there is no fail-safe device in the thermostat valve. Because embodiments of the present invention comprise an expandable thermal element therein, the basic function of thermostat valve is operable without the supply of electric power. Embodiments of the present invention are further provided with an elastic element for returning a rod without any electric power, such as a torsion spring. With the torsion spring, the rod is return to an initial position when electric power is disconnected. It means the operation of the thermostat valve of the present invention become identical with that of the conventional thermostat of mechanical type.

As described above, a cooling system of an automobile is significantly affected by driving conditions and a circumstance. A thermostat valve of mechanical type according to the prior art is, however, not provided with a function or elements to take into those influencing factors. Even an electronic thermostat valve having a heating means, which is widely used in recent, has some disadvantages causing a heating damage to elements.

Thus, an adjustable electronic thermostat valve of the present invention is advantageous at last in that:
1) heat damage of elements and sealing problems are eliminated by excluding additional heating means; 2) in structure, mechanical malfunction is significantly reduce by fixing the thermal element having flexibility; and 3) the cooling system of an automobile is maintained in an optimized state by controlling a displacement of a valve plate in response to control signals from an ECU that memorize best cooling mode based on the driving condition and circumstance.

Consequently, by employing the thermostat valve according to the present invention, it is possible to increase output power and endurance of an engine, to reduce exhaust gas and consumption of fuel.

Even though one embodiment of the present invention has been disclosed in the above specification, other embodiments and modifications will of course be apparent to those skilled in the art without departing from the scope of the appended claims.

What is claimed is:

1. An adjustable electronic thermostat valve capable of controlling displacement of a valve plate, the adjustable electronic thermostat valve comprising:
    a rod inserted into a chamber enclosing an expandable thermal element, said rod having screw threads partially formed at a surface of the rod;
    an operating means that transfers an expansion force of the expandable thermal element to a valve plate, wherein the operating means comprises:
        a case configured to accommodate the chamber of the thermal element;
        a diaphragm closing the chamber;
        a power-delivering liquid that transfers movement of the diaphragm
        a piston linearly moving in response to movement of the power-delivering liquid; and
        a moveable case that opens or closes a passage by moving a valve plate in response to the movement of the piston; and
    an actuating means coupled with said rod and configured to rotate said rod such that said rod is moved linearly in response to activating signals from an ECU based on driving conditions, whereby the volume of the chamber is changed, and wherein the actuating means is provided with an elastic element for returning the rod to an initial position in case of electric power failure.

2. The adjustable electronic thermostat valve according to claim 1, wherein the displacement of the valve plate is varied in proportion to the displacement of the rod operated by the actuating means.

3. The adjustable electronic thermostat valve according to claim 2, wherein the temperature at which the valve plate opens is between about 85° C. and about 105° C. in accordance with the movement of the rod.

4. The adjustable electronic thermostat valve according to claim 1, wherein displacement of the rod is adjustable by changing the ratio of a diameter of the rod to a diameter of the piston.

5. The adjustable electronic thermostat valve according to claim 1, wherein the actuating means can be selected from a linear step motor, DC motor, or linear solenoid.

6. The adjustable electronic thermostat valve according to claim 1, wherein the chamber of the expandable thermal element becomes maximized when the rod is in the initial position, so that the temperature at which the valve plate opens is configured to about 85° C. in case of electric power failure.

7. The adjustable electronic thermostat valve according to claim 1, wherein the operation of the valve plate depends on the piston and the movable case that move relative to the fixed chamber of the expandable thermal element.

8. The adjustable electronic thermostat valve according to claim 1, wherein the rod moves in linear motion.

9. An adjustable electronic thermostat valve, comprising:

a valve housing;

an inner case disposed within the housing;

a thermal element disposed in the inner case;

a diaphragm disposed in said inner case in contact with said thermal element;

a power transferring liquid in said case, separated from the thermal element by said diaphragm;

a rod supported within the housing for axial movement and extending into the inner case to cooperate with said thermal element;

means for controlling the axial position of the rod responsive to engine operating conditions; and a valve plate operatively engaged with said inner case to open and close the valve.

10. The valve of claim 9, further comprising:

a piston mounted below the inner case and acted on by said liquid; and at least one spring cooperating between the piston and valve plate to provide said operative engagement between the inner case and valve plate.

11. An adjustable electronic thermostat valve capable of controlling displacement of a valve plate, the adjustable electronic thermostat valve comprising:

a rod inserted into a chamber enclosing an expandable thermal element;

an operating means that transfers an expansion force of the expandable thermal element to a valve plate, wherein the operating means comprises:

a case configured to accommodate the chamber of the thermal element;

a diaphragm closing the chamber;

a power-delivering liquid that transfers movement of the diaphragm;

a piston linearly moving in response to movement of the power-delivering liquid;

a moveable case that opens or closes a passage by moving a valve plate in response to the movement of the piston; and an actuating means coupled with said rod and configured to rotate said rod such that said rod is moved linearly based on vehicle operating conditions.

12. The adjustable electronic thermostat valve according to claim 11, further comprising an elastic element for returning the rod to an initial position in case of electric power failure.

* * * * *